United States Patent
Shiba et al.

(10) Patent No.: US 7,022,933 B2
(45) Date of Patent: Apr. 4, 2006

(54) SEAM WELDING APPARATUS

(75) Inventors: Shoji Shiba, Higashimurayama (JP); Toyoaki Matsuzaki, Shizuoka-Ken (JP)

(73) Assignees: Xenesys Inc., (JP); Dengensha Mfg., Co., Ltd., (JP)

( * ) Notice: Subject to any disclaimer, the term of this patent is extended or adjusted under 35 U.S.C. 154(b) by 0 days.

(21) Appl. No.: 10/500,221

(22) PCT Filed: Jan. 30, 2003

(86) PCT No.: PCT/JP03/00916

§ 371 (c)(1),
(2), (4) Date: Jun. 25, 2004

(87) PCT Pub. No.: WO03/064099

PCT Pub. Date: Aug. 7, 2003

(65) Prior Publication Data

US 2005/0133504 A1      Jun. 23, 2005

(30) Foreign Application Priority Data

Jan. 30, 2002 (JP) .............................. 2002-021401

(51) Int. Cl.
*B23K 11/06* (2006.01)

(52) U.S. Cl. ..................................................... 219/82

(58) Field of Classification Search .................. 219/81, 219/82, 83, 84; 29/890.039
See application file for complete search history.

(56) References Cited

U.S. PATENT DOCUMENTS

| 2,263,038 | A | * | 11/1941 | Heim | .......................... 219/82 |
| 3,702,022 | A | * | 11/1972 | Duke et al. | ............ 29/890.039 |
| 3,881,083 | A | * | 4/1975 | Bromley | ....................... 219/84 |
| 4,688,631 | A | * | 8/1987 | Peze et al. | ................... 165/166 |

FOREIGN PATENT DOCUMENTS

EP            0235721 A1  *  9/1987

* cited by examiner

*Primary Examiner*—Clifford C. Shaw
(74) *Attorney, Agent, or Firm*—Rader, Fishman & Grauer PLLC

(57) ABSTRACT

A seam welding apparatus enables, even when metallic sheets are arranged in a line in a short distance, the welding electrodes to come into contact only with the metallic sheet to be welded, so as to provide a reliable welding of the metallic sheets to form connected portions having high strength. The roller electrode 20, which has on its outer peripheral portion the conical electrode surface 21, is supported by the central axis inclined relative to the surface of the metallic sheet 50 to be welded, and there is provided the stationary electrode 30 in which the portion including the flat electrode surface 31 has the smaller thickness. The electrode surface 21 of the roller electrode 20 is brought into contact with the surface of one of the metallic sheets 50 to be welded, while bringing the electrode surface 31 of the stationary electrode 30 into contact with the surface of the other metallic sheet 50. It is possible to prevent interference of the roller electrode 20 and the stationary electrode 30 with the metallic sheet 50, which is not currently subjected to the welding, and to hold firmly the metallic sheet 50 to be welded by the roller electrode 20 and the stationary electrode 30 to perform the seam welding.

5 Claims, 5 Drawing Sheets

SEAM WELDING APPARATUS

TECHNICAL FIELD

The present invention relates to a seam welding apparatus for performing seam welding for a metallic sheet, and especially to the seam welding apparatus enabling a plurality of metallic sheets, whish are arranged in a line, to be seam welded together without causing interference.

BACKGROUND OF THE INVENTION

If there is a wish that heat transfer coefficient is increased to enhance heat exchange effectiveness, in case of utilizing a heat exchanger by which interchange of heat (heat exchange) is made between a high temperature fluid and a low temperature fluid, a plate-type heat exchanger has conventionally been used widely. The plate-type heat exchanger has a structure in which a plurality of heat transfer members having a plate-shape are placed parallelly one upon another at prescribed intervals so as to form passages, which are separated by means of the respective heat transfer member. The high temperature fluid and the low temperature fluid flow alternately in the above-mentioned passages to make heat exchange through the respective heat transfer members.

In the conventional heat exchanger having the above-described structure, a gasket formed of elastic material is placed between the adjacent heat transfer members to keep the distance of the space between them constant and divide the space into passages for the fluids. However, an increased pressure of the heat exchange fluids passing through the space between the heat transfer members may cause occurrence of deformation of the gasket, thus making it impossible to separate properly the heat exchange fluids from each other and leading to improper change in distance between the heat transfer members, resulting in difficulty in effective heat exchange. Consequently, use of the heat exchange fluids is limited only within a pressure range that the gasket can withstand.

In view of such circumstances, the other plate-type heat exchanger having a structure in which the heat transfer members formed of metallic sheet and placed at a predetermined interval are directly connected at their edges through a brazed joint, without using any gasket, so as to combine the heat transfer members together, while forming passage portions on the opposite sides of the respective heat transfer member, has recently been put into practical use.

The conventional heat exchangers have the above-described structures. The heat exchanger in which the heat transfer members are brazed, can withstand a higher pressure of fluid than the heat exchanger utilizing the gasket. However, the brazing metal utilized to connect the heat transfer members to each other has a lower strength than the portion of the metallic sheet, due to the connection mechanism and property of brazed material. As a result, such a heat exchanger has a structure in which the strength in the joint portions of the heat transfer members is considerably deteriorated. When there is a large difference in pressure between the heat exchange fluids flowing on the opposite surfaces side of the heat transfer member and the high pressure heat exchange fluid passes the space between the heat transfer members connected to each other through the brazed joint, the brazed joint portion may break to cause the fluid to leak from the high pressure side to the low pressure side. Accordingly, the high pressure heat exchange fluid has not still been fully utilized, thus causing a problem.

With respect to connection of the metallic sheets, in which such a tight sealing property is regarded as important, it is preferable to apply a seam welding method, which provides the connected portion with a sufficient strength to enable the connected portion to withstand continuous and high pressure. However, the heat exchanger has the structure in which the metallic sheets for the heat transfer members are arranged in a line in the extremely short distance. As a result, when the conventional seam welding apparatus is used, a certain portion(s) of thereof may interfere with the metallic sheet, which is placed in parallel with the other metallic sheet to be welded. It has therefore been difficult to locate welding electrodes so as to place the metallic sheet to be welded between the welding electrodes, thus making it impossible to carry out the seam welding.

An object of the present invention is therefore to provide a seam welding apparatus, which enables, even when metallic sheets are arranged in a line in a short distance, welding electrodes to come into contact only with the metallic sheet to be welded, so as to provide a reliable welding of the metallic sheets to form connected portions having high strength.

DISCLOSURE OF THE INVENTION

A seam welding apparatus of the present invention, comprises:

at least one roller electrode, which is rotatable;

an other electrode for making a pair in cooperation with said roller electrode; and a main body for supporting said roller electrode and the other electrode, two metallic sheets to be welded, which are placed one upon another, being held at edge portions thereof between said roller electrode and said other electrode, said roller electrode being rotated to make a relative movement along the edge portions of the metallic sheets, while pressing the metallic sheets by both of the electrodes and applying an electric current to them therethrough, thereby seam welding the two metallic sheets, wherein:

said main body supports a plurality of sets of two metallic sheets to be welded so as to place the sets of two metallic sheets in a line at a predetermined interval;

said other electrode is a stationary electrode, which has a flat electrode surface continuously extending by substantially the same length as a portion to be welded of said metallic sheet, a portion of said stationary electrode, which include said electrode surface, having a smaller thickness than said interval between the sets of metallic sheets, said electrode surface coming into contact with the portion to be welded of one of the two metallic sheets to be welded;

said roller electrode is a disc-shaped body, which is rotatable around a central axis inclining at a predetermined angle relative to a surface of the metallic sheet, said disc-shaped body having an outer peripheral portion, which serves as a conical electrode surface based on a conical generatrix relative to the central axis, and said conical electrode surface being capable of coming into contact with the portion to be welded of the other of the two metallic sheets, in a state in which a top side of said conical electrode surface is placed on a side of the edge of the metallic sheet.

According to the present invention, the roller electrode, which has on its outer peripheral portion the conical electrode surface, is supported by the central axis inclined relative to the surface of the metallic sheet to be welded, and there is provided the stationary electrode in which the portion including the flat electrode surface has the smaller thickness. Even when a plurality of sets of two metallic sheets to be welded are placed in a line so that the plurality of sets of metallic sheets are welded together, it is possible to bring the electrode surface of the roller electrode in the inclined state into contact with the surface of one of the metallic sheets to be welded, while inserting the stationary electrode into a gap facing the other metallic sheet so as to bring the electrode surface of the stationary electrode into contact with the surface of the metallic sheet, thus preventing interference of the roller electrode and the stationary electrode with the metallic sheet, which is not currently subjected to the welding. It is therefore possible to hold firmly the metallic sheet to be welded by the roller electrode and the stationary electrode to apply pressure and an electric current to the metallic sheet, thus performing the seam welding, which provides the connection structure of the metallic sheets having high strength.

In the seam welding apparatus of the present invention, the above-mentioned conical electrode surface of said roller electrode may be electrically insulated from a bottom surface of a conical shape of said conical electrode.

According to the present invention, the end surface of the conical shape of the conical electrode is electrically insulated from the electrode surface of the roller electrode so that no welding current is applied to the above-mentioned bottom surface. Even if the end surface of the roller electrode, which is apt to come into contact with the other metallic sheet that is not currently subjected to the welding, comes into contact with the other metallic sheet, there occur no problem such as a short-circuit and it is possible to continue the welding operation utilizing the roller electrode, so as to carry out the same welding in a reliable manner, thus providing ensured tight sealing property and strength of the welded portion.

The seam welding apparatus of the present invention may further comprise one or more guide members provided at one or more prescribed positions on an upstream side and/or a downstream side of said roller electrode in a direction of said relative movement thereof so as to be movable together with said roller electrode relative to said metallic sheet and said stationary electrode, said guide members being disposed so as to be apart from the electrode surface of said stationary electrode by a distance of at least twice as much as a thickness of the metallic sheet, said guide members coming into contact with the metallic sheet with which said roller electrode comes into contact, while being electrically insulated from the roller electrode.

According to the present invention, the guide member, which is to come into contact with the metallic sheet with which the roller electrode is to come into contact, is provided on the upstream or downstream side of the roller electrode in the direction of the relative movement thereof so as to hold the two metallic sheets by means of the guide member, to prevent the two metallic sheets from being separated from each other. Even if the metallic sheets are warped or curved at their edge portions, it is therefore possible to bring the two metallic sheets into close contact with each other, irrespective of the pressing action by the roller electrode. As a result, it is possible to weld the metallic sheets together in an accurate positional relationship thereof, without causing deviation.

In the seam welding apparatus of the present invention, the above-mentioned roller electrode may have a conical surface, which is placed adjacently on the top side of said electrode surface and has a larger conical generatrix angle than that of the electrode surface.

According to the present invention, the electrode surface of the roller electrode has the other conical surface formed on the top side of the conical shape so that the thickness of the roller electrode becomes smaller from the central side to the outer peripheral side. It is therefore possible to impart a sufficient strength to withstand the pressing force applied to the metallic sheet to the whole roller electrode and facilitate insertion of the roller electrode into the gap between the metallic sheets. Interference of the roller electrode with the metallic sheet, which is not currently subjected to the welding, can be prevented, thus improving the welding operation.

BEST MODE FOR CARRYING OUT THE INVENTION

Figure 1:
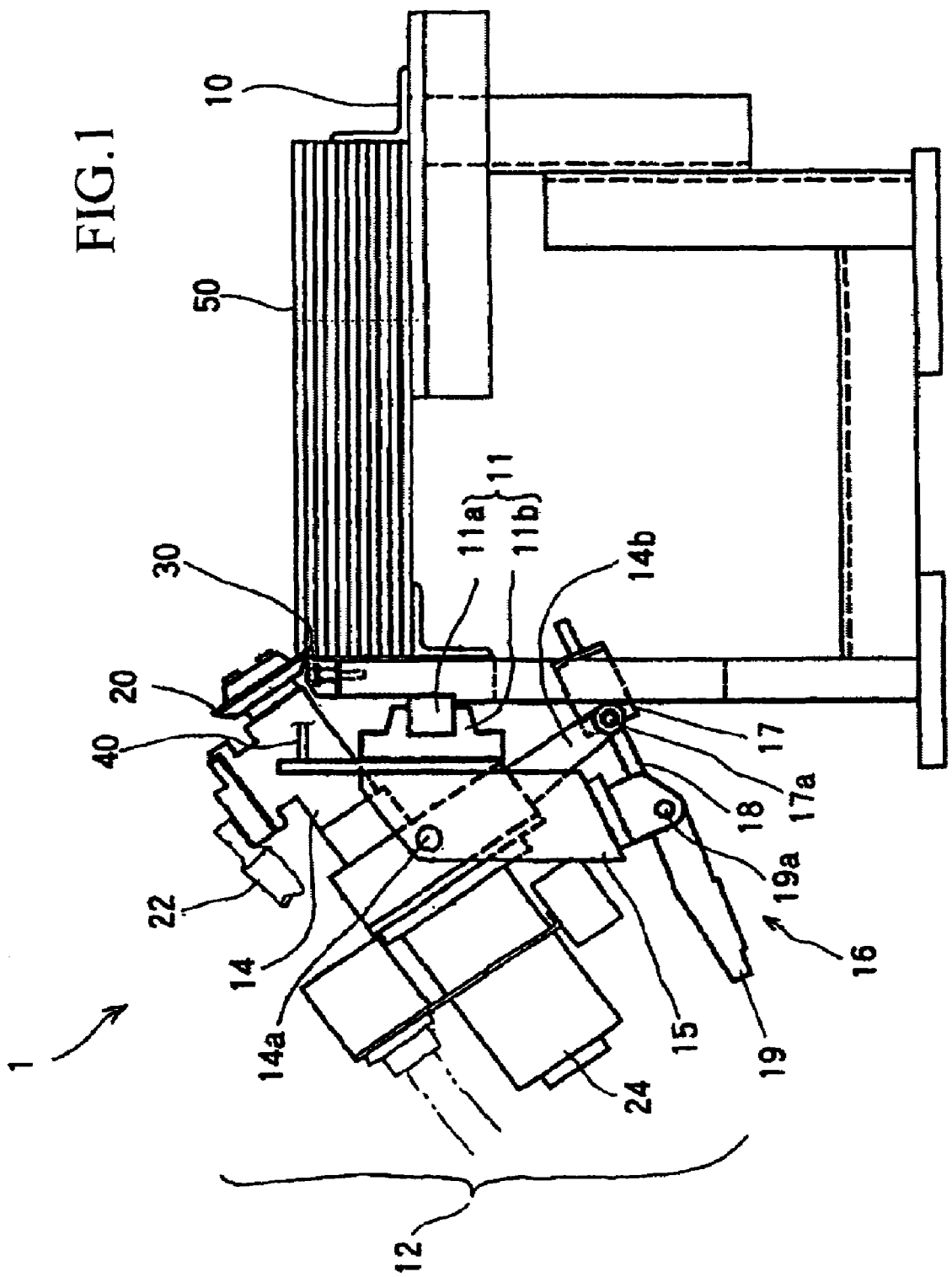
FIG. 1 is a side view of a seam welding apparatus according to an embodiment of the present invention.
Figure 2:
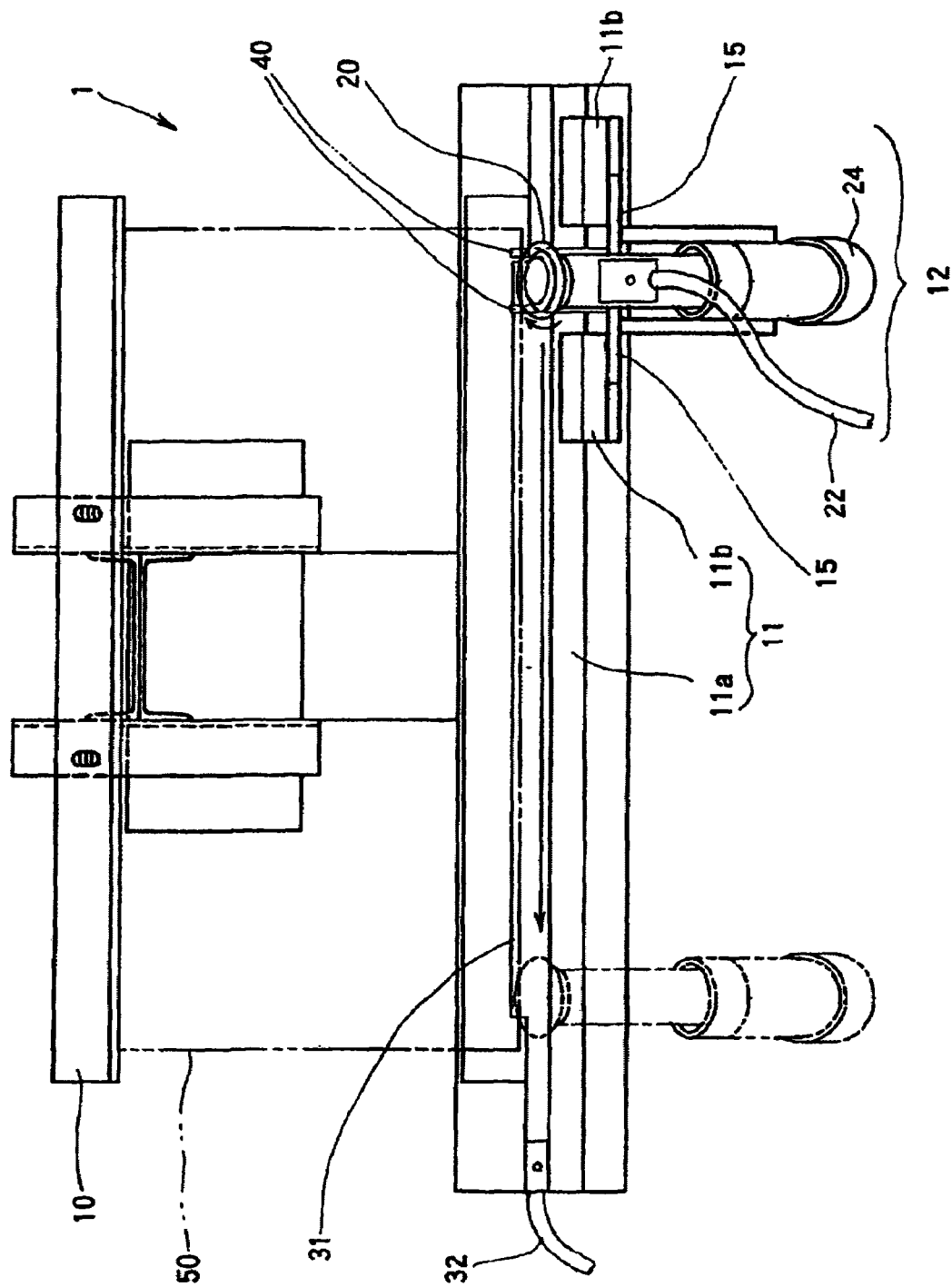
FIG. 2 is a plan view of the seam welding apparatus according to the embodiment of the present invention.
Figure 3:
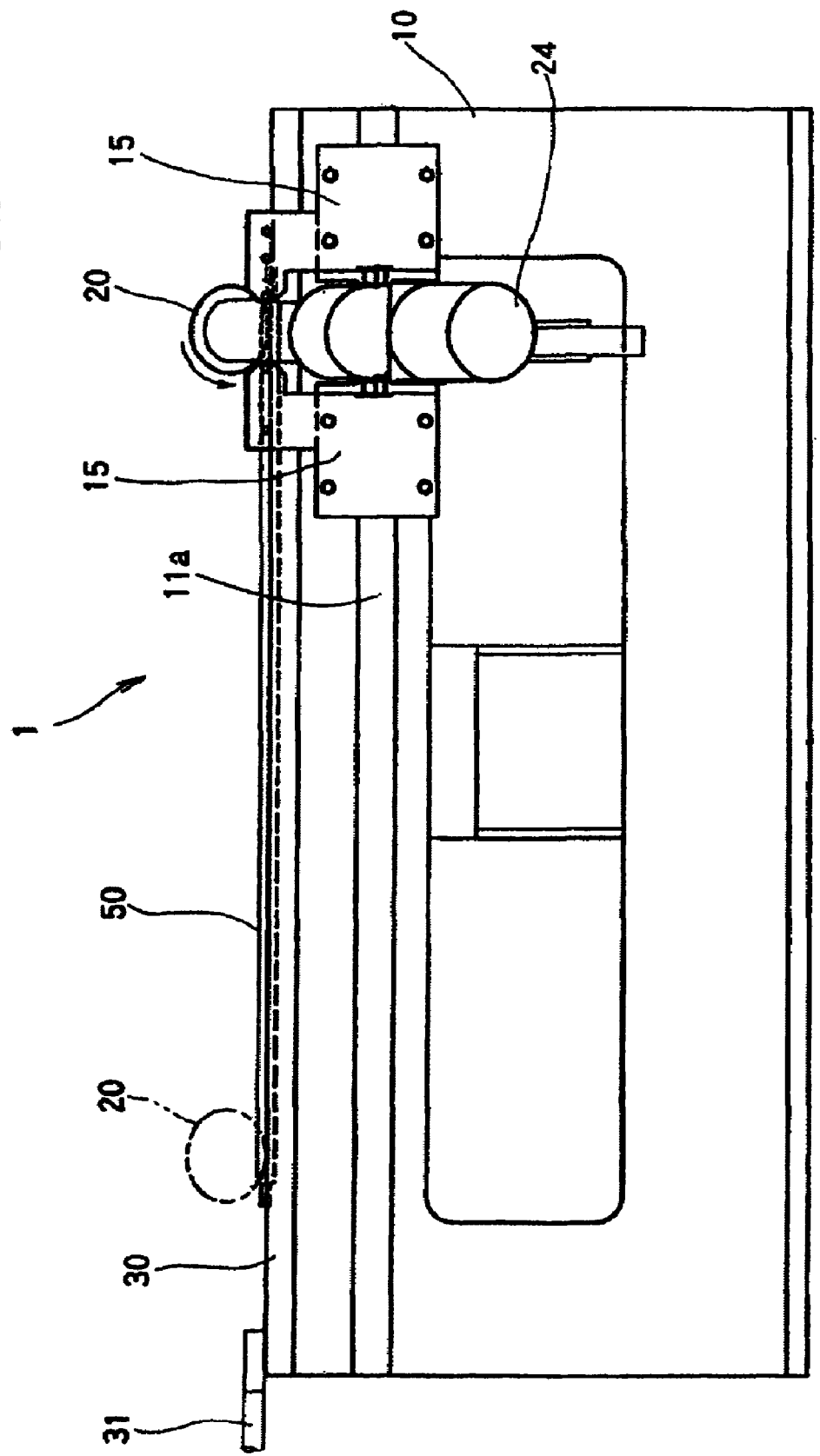
FIG. 3 is a front view of the seam welding apparatus according to the embodiment of the present invention.
Figure 4:
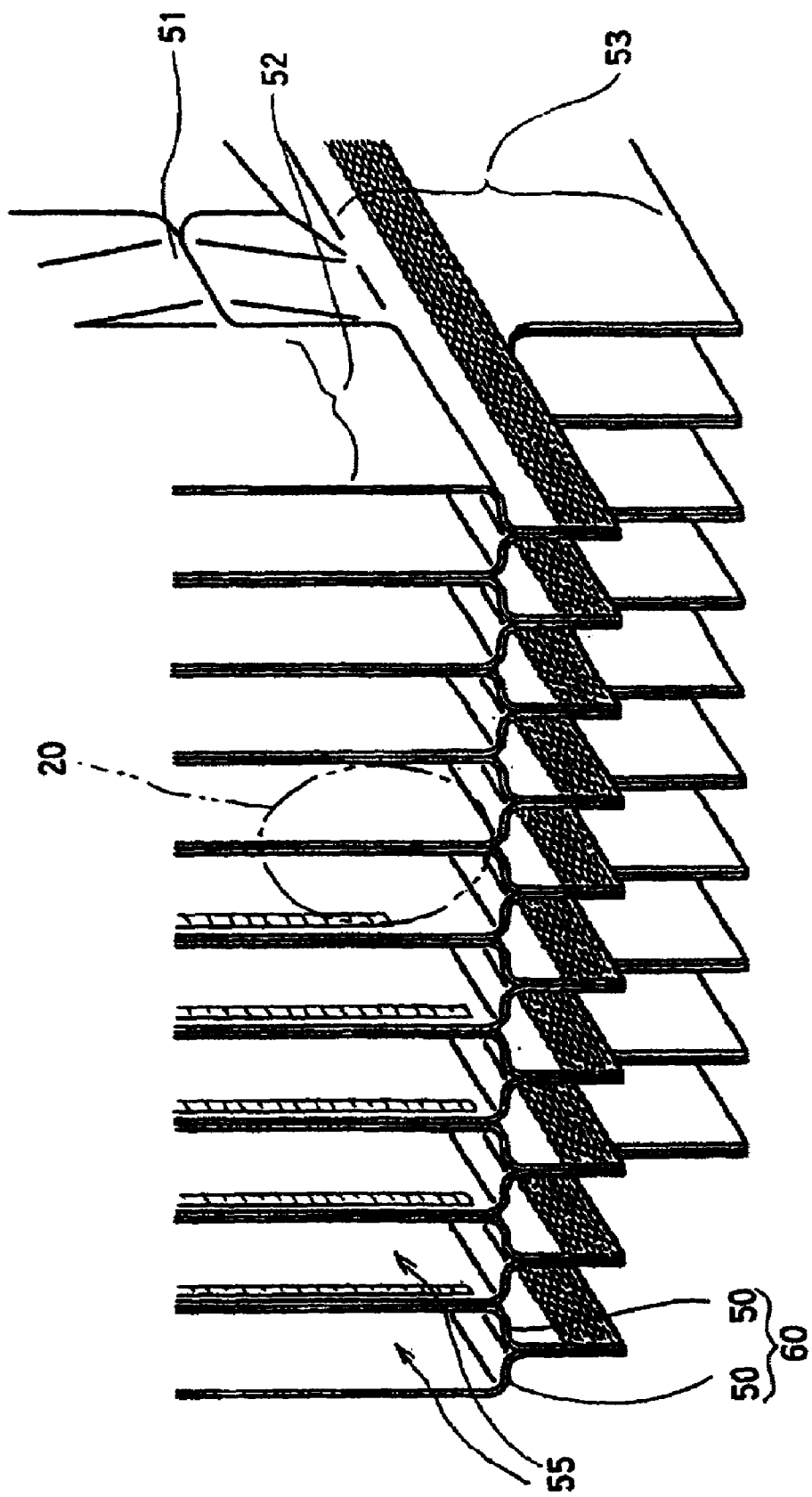
FIG. 4 is a descriptive view illustrating arrangement of metallic sheets, which are supported by the seam welding apparatus according to the embodiment of the present invention.
Figure 5:
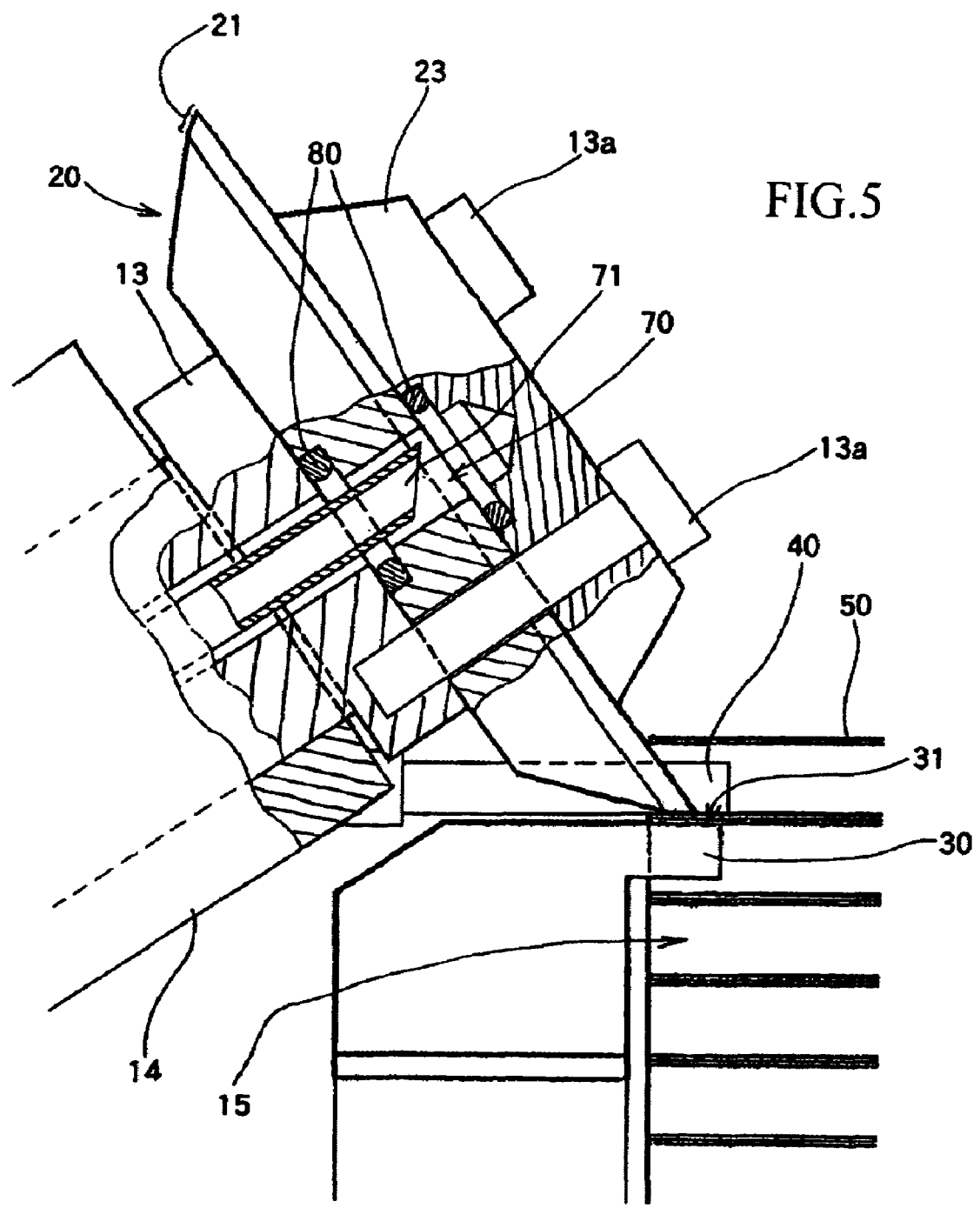
FIG. 5 is an enlarged view of essential structural components of the seam welding apparatus according to the embodiment of the present invention.

Now, an embodiment of the present invention will be described with reference to FIGS. 1 to 5. FIG. 1 is a side view of a seam welding apparatus according to an embodiment of the present invention; FIG. 2 is a plan view of the seam welding apparatus according to the embodiment of the present invention; FIG. 3 is a front view of the seam welding apparatus according to the embodiment of the present invention; FIG. 4 is a descriptive view illustrating arrangement of metallic sheets, which are supported by the seam welding apparatus according to the embodiment of the present invention; and FIG. 5 is an enlarged view of essential structural components of the seam welding apparatus according to the embodiment of the present invention.

The seam welding apparatus 1 according to the embodiment of the present invention includes, as shown in the figures, a main body 10 for supporting the whole of a plurality of sets of two metallic sheets 50 to be welded so as to place the sets of two metallic sheets in a line at a predetermined interval; a disc-shaped roller electrode 20, which is mounted on the main body 10 so as to be movable within a predetermined range in parallel with the edge of the metallic sheet 50 and is rotatable around the central axis inclined by a predetermined angel relative to the metallic sheet 50; a stationary electrode 30, which has a flat electrode surface 31 that is in parallel with the moving direction of the roller electrode 20, and is stationarily supported on the main body 10; and two guide members 40, which are provided at two positions on the main body 10 on the upstream and downstream sides of the roller electrode 20 in the moving direction thereof so as to be movable together with the roller electrode 20, and come into contact with the metallic sheet 50 with which the roller electrode 20 comes into contact, to urge the metallic sheet 50 against the stationary electrode 30.

The roller electrode 20 is formed into a disc-shaped body, which has on its outer peripheral portion a conical surface.

The outer peripheral portion of the conical surface serves as an electrode surface 21. The roller electrode 20 is provided rotatably as a part of a moving mechanism 12, which is supported on the main body 10 so as to be parallelly movable through a known linear motion guiding apparatus 11. The moving mechanism 12 includes an electrode rotation shaft 13 having the tip end thereof to which the roller electrode 20 and a cooling block 23 are fixed by means of bolts 13a; an electrode head 14 for rotatably supporting the electrode rotation shaft 13 and also supporting a roller electrode driving motor 24; a base member 15 for swingably supporting the electrode head 14 through a hinge 14a; and a pressing mechanism 16 for pressing the roller electrode 20 against the metallic sheet 50 by a predetermined pressing force utilizing a spring pressure system, as an occasion demands.

The known linear motion guiding apparatus 11 includes a guide rail 11a, which is disposed in parallel with the above-mentioned stationary electrode 30, and a movable block 11b, which is slidably fitted on the guide rail 11a. The base member 15 of the moving mechanism 12, which includes the roller electrode, is fixed on the above-mentioned movable block 11b so as to be movable in parallel with the edge of the metallic sheet 50 to be welded, together with the movable block 11b.

The electrode head 14 is swingably supported around the hinge 14a so as to enable the roller electrode 20, which is provided on the tip end of the electrode head 14, to come close to the stationary electrode 30 or go away therefrom. The pressing mechanism 16 includes a spring case 17, which is swingably supported through a hinge 17a on a bracket 14b projecting from the electrode head 14; a spring (not shown) received in the spring case 17; a rod 18 connected to the spring; and a handle 19 swingably supported through a hinge 19a on the base member 15. Operating the handle 19, which is also connected to the rod 18, causes a toggle function for pressure required for welding to move the electrode head 14, thus enabling the roller electrode 20 to be put in a pressed state or a released state.

The electrode surface 21 of the roller electrode 20 is formed into a conical shape having a conical generatrix angle, which is identical to the inclination angle of the central axis of the roller electrode 20 relative to the metallic sheet 50. The top side of the conical shape is placed on the side of the edge of the metallic sheet 50. The electrode surface 21 can come into contact with an edge portion, i.e., a portion to be welded of the metallic sheet 50, which is away from the main body 10, of the two metallic sheets to be welded, supported by the main body 10. The inclination angle of the central axis of the roller electrode 20 relative to the metallic sheet 50 and the conical generatrix angle of the electrode surface 21 are determined within ranges so that, in a state in which the roller electrode 20 comes into contact with the portion of the metallic sheet 50 to be welded, the roller electrode 20 does not interfere with the other metallic sheet 50. Especially, it is preferable to set the inclination angle of about 35 degree of the central axis of the roller electrode 20 relative to the surface of the metallic sheet 50 to which the pressing force is to be applied by the electrode surface 21.

The roller electrode has a conical surface, which is placed on the top side of the electrode surface 21 and has a larger conical generatrix angle than the electrode surface 21 so as to ensure the sufficient strength of the whole roller electrode 20 and provide a shape having the reduced thickness of the outer peripheral portion. In addition, the surface of the bottom of the conical shape is covered with material, which is insulated form the electrode surface 21 of the roller electrode 20.

In addition, a continuously extending cooling hole 70 is formed in the inside of the roller electrode 20, the electrode rotation shaft 13 and the cooling block 23. A pipe 71 for supplying cooling water is inserted into the cooling hole 70. Supplying the cooling water into a deep side of the cooling hole 70 through the pipe 71 and then introducing the cooling water to the outside of the hole through a space between the outer surface of the pipe 71 and the inner surface of the cooling hole 70 to circulate the cooling water in the inside of the roller electrode 20 makes it possible to prevent the temperature of the roller electrode 20 from increasing due to resistance heat during welding. O-rings 80 to maintain the watertight sealing property are inserted between the contact surfaces of the electrode rotation shaft 13 and the roller electrode 20 and the contact surface of the roller electrode 20 and the cooling block 23.

The stationary electrode 30 has a flat electrode surface 31 continuously extending by substantially the same length as the portion to be welded of the metallic sheet 50 on the edge side thereof. The portion of the stationary electrode, which includes the electrode surface 31, has a smaller thickness than the interval between the set of metallic sheets 50. The above-mentioned portion of the stationary electrode can be inserted into a gap 55 between the set of metallic sheets so as to come into contact with the portion adjacent to the edge of the metallic sheet 50, which is to be subjected to the welding, or removed from the gap. The stationary electrode 30 and the roller electrode 20 are connected to a welding power source (not shown) through cables 32, 22, respectively.

The guide members 40 are two bar-shaped bodies projecting from the base member 15, which is movable relative to the main body 10 in an interlocking relation to the roller electrode 20. The guide members are electrically insulated from the roller electrode 20. The peripheral surface of the bar-shaped body comes into contact with the surface of the metallic sheet 50 on the side thereof with which the roller electrode 20 comes into contact with, to hold the metallic sheet 50. This structure prevents the two metallic sheets 50 to be welded from separating from each other between the roller electrode 20 and the stationary electrode 30.

Now, description will be given below of the welding process of the metallic sheets utilizing the seam welding apparatus according to the embodiment of the present invention. As a precondition, the metallic sheet 50 to be welded has a central portion having a rectangular shape, on which a heat transfer face 51 having corrugation optimized for heat transfer is previously formed by means of a predetermined pressing apparatus (not shown) so as to serve as the heat transfer member of the heat exchange unit, and flat portions 52, 53 are formed on the outer peripheral edge surrounding the heat transfer face 51. Such a metallic sheet 50 is placed on the other metallic sheet 50 and these sheets are seam-welded together at the flat portions 53 of the edges on the opposite sides of the metallic sheets in the direction of the shorter sides thereof in a watertight manner, with the use of the known usual seam welding apparatus to form a welding unit 60. Such a welding unit 60 and the other welding units 60 are placed one upon another in a combined state and then supported on the main body 10. The flat portions 52 of the metallic sheets 50, which are overlapped one another and come into contact with each other on the sides of the metallic sheets in the direction of the longer side thereof, are to be welded.

In the welding process, the stationary electrode 30 is inserted first into the gap 55, which faces the metallic sheets 50 placed on the adjacent side to the main body 10, of the plurality of sets of metallic sheets, as overlapped one another and the electrode surface 31 is brought into contact with the metallic sheet 50. In addition, the roller electrode 20 is placed in the welding starting position within the range of movement on the main body 10 and the electrode surface 21 of the roller electrode 20 is brought into contact with the other metallic sheet 50. The guide members 40 disposed on the opposite sides of the roller electrode 20 urge the metallic sheet 50 against the stationary electrode 30 on the opposite sides of the contact position of the roller electrode 20 to provide a state in which the two metallic sheets 50 are placed one upon another in a reliable manner and brought into contact with each other.

A pressing/current-applying operation utilizing the roller electrode 20 is started and then the motor 24 drives the roller electrode 20 through the electrode rotation shaft 13. The driven roller electrode 20 rotates to roll on the metallic sheet 50, while the whole moving mechanism 12 travels along the guide rail 11a in parallel to the edge of the metallic sheet 50 so that the two metallic sheets 50 are seam welded together between the electrode surface 21 of the traveling roller electrode 20 and the electrode surface 31 of the stationary electrode 30. The roller electrode 20 having the conical electrode surface 21 comes into contact with the metallic sheet 50 in an inclined state and the stationary electrode 30 is provided with the low-profile portion having the electrode surface 31. It is therefore possible to prevent the roller electrode 20 and the stationary electrode 30 from interfering with the other metallic sheets than the metallic sheet currently subjected to the welding, thus performing the seam welding, while pressing the two metallic sheets 50 by means of the roller electrode 20 and the stationary electrode 30 in a reliable manner. When the roller electrode 20 reach the welding finishing position within the range of movement, the pressing/current-applying operation utilizing the roller electrode 20 halts, and the electrode surface 21 of the roller electrode 20 is removed from the metallic sheet 50, thus completing a single step of the welding process.

When the stationary electrode 30 is also removed from the set of metallic sheets, to which the welding step has been applied, the supporting position of the metallic sheets 50 on the main body 10 is shifted so as to place the other two metallic sheets 50 to be welded in the welding position. After the roller electrode 20 and the stationary electrode 30 are rearranged so as to hold the above-mentioned other two metallic sheets 50 between the roller electrode 20 and the stationary electrode 30, the sequential welding operation is repeated.

When all the metallic sheets 50 are welded together to combine the welding units 60 of the metallic sheets 50 into the heat exchange unit (not shown), the entire metallic sheets 50 of which the heat exchange unit is composed, is removed from the main body 10, and then the sequential welding process is completed. In the thus obtained heat exchange unit, the edge portions of the metallic sheets are seam welded together, thus providing high strength and withstand the high pressure of the liquid.

According to the seam welding apparatus of the embodiment of the present invention, the roller electrode 20, which has on its outer peripheral portion the conical electrode surface 21, is supported by the central axis inclined relative to the surface of the metallic sheet 50 to be welded, and there is provided the stationary electrode 30 in which the portion including the flat electrode surface 31 has the smaller thickness. The electrode surface 21 of the roller electrode 20 is brought in the inclined state into contact with the surface of one of the metallic sheets 50 overlapped one another, while inserting the stationary electrode 30 into the gap facing the other metallic sheet 50 so as to bring the electrode surface 31 of the stationary electrode 30 into contact with the surface of the metallic sheet 50. Even when a plurality of sets of metallic sheets 50 are placed in a line by a predetermined interval, it is possible to prevent interference of the roller electrode 20 and the stationary electrode 30 with the metallic sheet 50, which is not currently subjected to the welding. It is therefore possible to hold firmly the metallic sheet 50 to be welded by the roller electrode 20 and the stationary electrode 30 to perform the seam welding. In addition, the end surface of the conical shape of the conical electrode is electrically insulated from the electrode surface 21 of the roller electrode 20. Even if the end surface of the roller electrode 20 comes into contact with the other metallic sheet 50 that is not currently subjected to the welding, there occur no problem such as a short-circuit and it is possible to continue the welding operation utilizing the roller electrode 20, so as to carry out the same welding in a reliable manner.

INDUSTRIAL AVAILABILITY

According to the present invention, the roller electrode, which has on its outer peripheral portion the conical electrode surface, is supported by the central axis inclined relative to the surface of the metallic sheet to be welded, and there is provided the stationary electrode in which the portion including the flat electrode surface has the smaller thickness. Even when a plurality of sets of two metallic sheets to be welded are placed in a line so that the plurality of sets of metallic sheets are welded together, it is possible to bring the electrode surface of the roller electrode in the inclined state into contact with the surface of one of the metallic sheets to be welded, while inserting the stationary electrode into a gap facing the other metallic sheet so as to bring the electrode surface of the stationary electrode into contact with the surface of the metallic sheet, thus preventing interference of the roller electrode and the stationary electrode with the metallic sheet, which is not currently subjected to the welding. It is therefore possible to hold firmly the metallic sheet to be welded by the roller electrode and the stationary electrode to apply pressure and an electric current to the metallic sheet, thus performing the seam welding, which provides the connection structure of the metallic sheets having high strength.

According to the present invention, the end surface of the conical shape of the conical electrode is electrically insulated from the electrode surface of the roller electrode so that no welding current is applied to the above-mentioned bottom surface. Even if the end surface of the roller electrode, which is apt to come into contact with the other metallic sheet that is not currently subjected to the welding, comes into contact with the other metallic sheet, there occur no problem such as a short-circuit and it is possible to continue the welding operation utilizing the roller electrode, so as to carry out the same welding in a reliable manner, thus providing ensured tight sealing property and strength of the welded portion.

According to the present invention, the guide member, which is to come into contact with the metallic sheet with which the roller electrode is to come into contact, is provided on the upstream or downstream side of the roller electrode in the direction of the relative movement thereof so as to hold the two metallic sheets by means of the guide member, to prevent the two metallic sheets from being separated from each other. Even if the metallic sheets are warped or curved at their edge portions, it is therefore possible to bring the two metallic sheets into close contact with each other, irrespective of the pressing action by the roller electrode. As a result, it is possible to weld the metallic sheets together in an accurate positional relationship thereof, without causing deviation.

According to the present invention, the electrode surface of the roller electrode has the other conical surface formed on the top side of the conical shape so that the thickness of the roller electrode becomes smaller from the central side to the outer peripheral side. It is therefore possible to impart a sufficient strength to withstand the pressing force applied to the metallic sheet to the whole roller electrode and facilitate insertion of the roller electrode into the gap between the metallic sheets. Interference of the roller electrode with the metallic sheet, which is not currently subjected to the welding, can be prevented, thus improving the welding operation.

What is claimed is:

1. A seam welding apparatus, which comprises:
   at least one roller electrode, which is rotatable;
   an other electrode for making a pair in cooperation with said roller electrode; and
   a main body for supporting said roller electrode and the other electrode,
   two metallic sheets to be welded, which are placed one upon another, being held at edge portions thereof between said roller electrode and said other electrode, said roller electrode being rotated to make a relative movement along the edge portions of the metallic sheets, while pressing the metallic sheets by both of the electrodes and applying an electric current to them therethrough, thereby seam welding the two metallic sheets,
   wherein:
   said main body supports a plurality of sets of two metallic sheets to be welded so as to place the sets of two metallic sheets in a line at a predetermined interval;
   said other electrode is a stationary electrode, which has a flat electrode surface continuously extending by substantially the same length as a portion to be welded of said metallic sheet, a portion of said stationary electrode, which includes said electrode surface, having a smaller thickness than said interval between the sets of metallic sheets, said electrode surface coming into contact with the portion to be welded of one of the two metallic sheets to be welded;
   said roller electrode is a disc-shaped body, which is rotatable around a central axis inclining at a predetermined angle relative to a surface of the metallic sheet, said disc-shaped body having an outer peripheral portion, which serves as a conical electrode surface based on a conical generatrix relative to the central axis, and said conical electrode surface being capable of coming into contact with the portion to be welded of the other of the two metallic sheets, in a state in which a top side of said conical electrode surface is placed on a side of the edge of the metallic sheet.

2. The seam welding apparatus as claimed in claim 1, wherein:
   said conical electrode surface of said roller electrode is electrically insulated from a bottom surface of a conical shape of said conical electrode.

3. The seam welding apparatus as claimed in claim 1 or 2, further comprising:
   one or more guide members provided at one or more prescribed positions on an upstream side and/or a downstream side of said roller electrode in a direction of said relative movement thereof so as to be movable together with said roller electrode relative to said metallic sheet and said stationary electrode, said guide members being disposed so as to be apart from the electrode surface of said stationary electrode by a distance of at least twice as much as a thickness of the metallic sheet, said guide members coming into contact with the metallic sheet with which said roller electrode comes into contact, while being electrically insulated from the roller electrode.

4. The seam welding apparatus as claimed in claim 3, wherein:
   said roller electrode has a conical surface, which is placed adjacently on the top side of said electrode surface and has a larger conical generatrix angle than that of the electrode surface.

5. The seam welding apparatus as claimed in claim 1 or 2, wherein:
   said roller electrode has a conical surface, which is placed adjacently on the top side of said electrode surface and has a larger conical generatrix angle than that of the electrode surface.

* * * * *